United States Patent Office 3,635,861
Patented Jan. 18, 1972

3,635,861
PRESSURE-SENSITIVE HOT-MELT ADHESIVES
Thomas E. Russell, Verona, N.J., assignor to The
Flintkote Company, White Plains, N.Y.
No Drawing. Filed June 28, 1968, Ser. No. 741,231
Int. Cl. C09j 3/26
U.S. Cl. 260—27
9 Claims

ABSTRACT OF THE DISCLOSURE

A pressure-sensitive adhesive composition having instant room temperature tack, good cold flow resistance and good shear strength which comprises as a first component a resinous rubbery block copolymer of styrene and butadiene or isoprene, as a second component a rubber extending petroleum oil, and as a third component a modified or unmodified rosin, a coumarone-indene resin, a polyterpene resin, a diene-olefin aliphatic hydrocarbon resin or a polystyrene resin, and optionally as a fourth component a resinous atactic polypropylene.

---

This invention relates to pressure-sensitive adhesives, and more particularly to pressure-sensitive adhesives that have instant room temperature tack, good cold flow resistance and shear strength, are essentially unaffected by moisture, and can be made as hot melts without solvents.

Countless uses exist for pressure-sensitive adhesives that have good quick tack at ordinary temperatures, adhere to numerous surfaces upon contact with essentially no pressure, are essentially free of cold flow, so-called "creep," resist shearing stresses, do not deteriorate under moist conditions and retain their desirable properties during prolonged periods of storage, i.e., have good shelf-life. Such uses include being thinly coated onto the under surfaces of floor tiles and wall tiles that thereafter can be set quickly and permanently on floors or walls. The pressure-sensitive adhesives of this invention are especially suited for such uses, inter alia. Thus they can be coated onto substrates like floor and wall tiles by the manufacturer, and covered with a removable protective sheet to form a so-called "peel-and-stick" product.

An object of this invention is to provide pressure-sensitive adhesives. Another object of this invention is to provide pressure-sensitive adhesives that have good instant tack, high strength in shear, virtually no cold flow, resistance to moisture and storage stability. A further object of this invention to provide a method for making such pressure-sensitive adhesives by hot-melt means without solvents. These and other objects of this invention will be in part discussed in and in part apparent from the following more detailed disclosure.

Broadly the pressure-sensitive adhesives of this invention contain three components which, in intimate combination with one another in the proportions specified, provide the desirable properties herein before discussed. The primary components are a resinous rubbery block copolymer of styrene and butadiene or styrene and isoprene, a rubber compounding and extending petroleum oil fraction, and one or more of a modified or umodified rosin, coumarone-indene resin, polyterpene resin, diene-olefin aliphatic hydrocarbon resin or polystyrene resin. Other ingredients can, of course, be included in the adhesives to attain additional desiderata, for example, an antioxidant to protect the various resins, especially during hot-melt blending and coating of the adhesive in molten condition onto substrates. Moreover, by selection of particular components from among the variety of each available, the properties of the adhesive compositions can be modified somewhat as might be necessary. For example, shear strength and hot and cold flow for application can be modified by the selection as well as the proportioning of the rubbery block copolymer, whereas quick tack and presssure-sensitivity can be varied by the choice and proportion of the other resinous components.

Rubbery block copolymers of styrene and butadiene or styrene and isoprene that are especially advantageous to use in the instant adhesives are those in which the monomers are not randomly mixed but rather are in groups of poly-monomers, i.e., groups or blocks of polystyrene-polybutadiene-polystyrene or polystyrene-polyisoprene-polystyrene. The polystyrene groups have molecular weights of from about 5,000 to about 125,000, preferably between about 8,000 and 45,000; the polybutadiene or polyisoprene blocks have molecular weights of between about 15,000 and about 250,000, preferably from about 35,000 to about 150,000. Such copolymers can contain from about 20% to about 80% of either block polymer. Such rubbery block copolymers are commercially available under the trade name "Kraton," for example, Kraton 101 and 102 which are polystyrene-polybutadiene-polystyrene copolymers, and Kraton 107 which is the polyisoprene counterpart. They can be used in amounts of between about 15% and about 50% by weight of the tricomponent adhesive, preferably from about 20% and 35% by weight. Combinations of different rubbery block copolymers can be used.

Another principal component of the pressure-sensitive adhesive compositions of this invention is a petroleum oil fraction used in the processing of natural and synthetic rubber, for example, for rubber compounding and rubber extending. Such oils have controlled hydrocarbon compositions and varying viscosities, and range from paraffinic through naphthenic to highly aromatic. As components in the instant adhesive compositions, the rubber-extending oils that presently have been found to be suitable are those having specific gravities ranging from about 0.80 to about 1.00, preferably from about 0.82 to about 0.92, viscosities of from about 100 to about 1000 SSU at 100° F., preferably from about 300 to about 800 SSU, and are 90% distillates at from about 700° F. to about 1000° F., preferably from about 720° F. to about 870° F. Commercially available rubber extending oils of the foregoing description include "Shell Dutrexes" and "Shellflexes," particularly Nos. 298, 315 and 357 of the former type and Nos. 210, 274, 310, 371 and 412 of the latter type, and "Sunthenes." Such oils can be used in the adhesives in amounts ranging from about 10% to about 40%, preferably from about 20% to about 30%, by weight based on the total weight of the three principal components.

The third principal component of the subject adhesives can be a modified or unmodified rosin, polyterpene resin, coumarone-indene resin, polystyrene resin or diene-olefin aliphatic hydrocarbon resin. Such rosins include ethylene glycol, polyethylene glycol, glycerol and pentaerythritol rosin esters, hydrogenated rosin esters or methylated rosin esters, for example, the commercially available materials "Staybelite" Ester 3 triethylene glycol ester of hydrogenated rosin, "Foral" 85 and 105 highly stabilized ester resins of pentaerythritol and rosin base, "Hercolyn" D hydrogenated methyl ester of rosin purified by steam distillation, and "Pentalyn" H pentaerythritol ester of hydrogenated rosin and K pentaerythritol ester of dimeric resin acids, all sold by 3, "Foral" 85 and 105, "Hercolyn D" and "Pentalyn" H and K. Suitable terpene polymers are, for example, solid or liquid poly-($\alpha$-pinene) such as "Piccolyte Alpha" 10, 25 and 115 having corresponding softening points in ° C. and molecular weights of 100, 125 and 1200, and poly-($\beta$-pinene) such as "Piccolyte" S–100 and S–115 having molecular weights of about 1200. Coumarone-indene resins are available as "Piccovar" L–30 and L–60, which have molecular weights of about 600 to 700, "Nevex" 100 and "Nevchem" 100 and 140. Diene-olefin aliphatic hydrocarbon resins are, for example, "Piccopale" 45, 85 and 110, which have molecular weights of about 600, 1000 and 1500. The polystyrene resins are of intermediate molecular weight, e.g., from about 300 to about 6000, preferably to about 1000. Suitable commercially available resins include "Piccolastic" A, D and E series, especially the A series.

These third-component resins can be used in the adhesives in an amount of from about 20% to about 70% by weight of the principal components, preferably between about 40% and about 60%. They can be used in combination either as resins of the same class, for example, the Piccolyte Alpha 25, 100 and 115 Poly-($\alpha$-pinene) resins, or two or three of the different classes, for example Foral 105 highly stabilized ester resin and Piccolyte Alpha 25. In general the proportions of each resin in a class, or of each resin of the different classes, can vary quite widely, the determining factor seeming to be those discussed herein before, e.g., the specific desired extent of properties such as quick tack, pressure-sensitivity, cold flow, shear strength, coatability of the molten adhesive and so forth. No specific rule presently appears to prevail.

From about 0.01% to about 2.0% by weight of one or more antioxidants desirably are added to the adhesives. Antioxidants known to be effective for the various components, especially for the rubbery block copolymer and the atactic polypropylene, can be used. Such antioxidants include, for example, "Ionox" 220, and 330 tris[di-t-butyl-p-hydroxybenzyl] - trimethylbenzene, "Dalpac" 4C 2,6-di(t-butyl)-p-cresol, Naugawhite" alkylated bis-phenol and "Butyl Zimate" Zinc Dibutyl Dithiocarbamate. Ordinarily about 0.25% to about 0.75% of antioxidant, based on the amount of composition, is sufficient.

It is also possible to include, optionally and in some instances preferably, a fourth principal component in the instant adhesive compositions. That principal component is an atactic polypropylene, which is an essentially non-crystalline polypropylene formed in comparatively small amounts during the production of isotactic, or crystalline, polypropylene by stereoscopic polymerization of propylene. The solid atactic polypropylene has a molecular weight of between about 15,000 and about 60,000, and preferably for suitability in the instant adhesives from about 16,000 to about 20,000. A commercially available atactic polypropylene for such use is produced under the name "Oletac" 100. This component is included in the adhesive compositions in an amount of from about 5% to about 30% by weight thereof, desirably in an amount between about 10% to about 25%. If atactic polypropylene is used in the adhesives, the amount of rubber-extending oil should be reduced to between about 7% and about 30%, preferably from about 10% to about 25%, and the amount of the third-component resin should be reduced to between about 20% and about 60%, preferably about 35% to about 50%.

The rubbery polystyrene-poly(conjugated diene)-polystyrene block copolymers are thermoplastic in nature and have no sharp melt point. Thus they cannot simply be melted with the other resins to any appreciably significant extent. It has been found possible, however, to avoid using a solvent for the rubbery copolymer, and instead to prepare the pressure-sensitive adhesives of this invention containing sufficient rubbery block copolymers by a completely hot-melt technique. An additional benefit of the method is that the adhesives can be melt coated onto suitable substrates; solvent coating systems are unnecessary.

Initially the rubbery block copolymer, which is ordinarily produced in crumb form, is mechanically mixed with the rubber-extending oil component to form an intimate, meltable mix. The latter component generally is preblended in an amount ranging from about one-half to about equal the amount of block copolymer, preferably at least about three-quarters as much. Considerable variation is possible depending upon the specific block copolymer and oil, and the overall proportions of the adhesive. Preblending of those two components can be accomplished by tumbling them together in any suitable tumbling device that, desirably, does not exert particularly high shear stresses on the copolymer crums. Preblending is at room temperature or up to about 150° F. Although it is possible to work at either lower or higher temperatures, practical factors tend to preclude doing so, for example, degradation of the copolymer and difficulty of blending and removing the preblended mix. Preblending in a suitable rotary vessed at room temperature ordinarily requires in the order of about six hours to about sixteen hours, usually about eight to ten hours. At higher temperatures the time of tumbling is reduced, e.g., to about one hour at 150° F. During tumbling the rubbery block copolymer crumbs absorb substantially all of the oil, preferably in an amount at least equal to about three-quarters their own weight, but otherwise remain essentially unchanged physically except for some enlargement, or swelling.

The adhesive composition is completed by melting the preblended components in an agitated vessel heated at from about 250° F. to about 350° F., usually about 275° to about 325° F. An antioxidant can be added as soon as it readily will mix with the melting preblend. Thereafter the other component or components of the adhesive are added directly to the hot melt, preferably first any of the atactic polypropylene, if that principal component is used, and then the modified or unmodified rosin, polyterpene, coumarone-indene, diene-olefin or polystyrene resin component. The batch is blended until a clear, smooth-running, homogeneous composition is formed. The composition can be coated onto a substrate, for example, as a coating from about 1 to about 5 mils thick, preferably about 2 to 4 mils, or can be cooled to a resilient, tacky solid at room temperature for subsequent remelting and application, e.g., at about 300° F.

Adhesives according to this invention, which are at least essentially 100% solids, have a Brookfield viscosity (No. 7 spindle at 300° F., 20 r.p.m.) in the range of about 25,000 to 150,000 cps., preferably about 35,000 to 65,000 cps.; a softening point (Ring and Ball, ASTM D–36–26) of at least about 200° F., preferably from about 225° F. to 275° F.; a penetration hardness (ASTM D–5–49, room temperature) in the range of about 0.3 cm. to 1.3 cm., preferably about 0.5 cm. to 0.8 cm.; and a loss on heating (ASTM D–6–39T, 5 hours at 300° F.) of amout 10% maximum, preferably below about 5%.

The following examples are specific embodiments of adhesive compositions set forth to illustrate the invention.

EXAMPLE 1

A mix of 22.00 parts (by weight unless otherwise specified) of Kraton 101 polystyrene-polybutadiene-polystyrene block copolymer crumb and 22.00 parts of Shellflex 371–N, a rubber-extending petroleum oil, specific gravity 0.90, viscosity 427 SSU at 100° F., and 90% distillates at 865° F., was tumbled for about ten hours at room temperature until all the oil had been absorbed. The crumb-oil composition was then melted at about 275° F. to 300° F. in a heated vessel having a stirrer. An antioxidant, 0.25 part of Ionox 333 hindered phenol, was added as the preblend melted. Thereafter 55.75 parts of Piccolyte Alpha 115 polyterpene resin were added to the hot melt. Mixing of the hot melt was continued for about one-half hour until a clear, smoothly-flowing, homogeneous composition was formed. The composition was poured into a mold and cooled to a resilient block at room temperature.

A portion of the solid adhesive thus prepared was melted and coated at about 300° F. onto 9" x 9" vinyl-asbestos floor tiles. The pressure-sensitive coating, which was about 4 mils thick on the tiles, had good quick tack, good pressure-sensitivity and virtually no cold flow. Some of the tiles were placed on a cleaned concrete floor on which they had excellent shear strength. Similar results were obtained with other tiles placed on a vertical plywood wall.

The adhesive composition was coated onto various materials and tested for peel strength (Pressure Sensitive Tape Council #1, at 180° F.). The results were greater than 160 ounces per inch on plywood, stainless steel, asbestos cement and vinyl asbestos substrates. The results were essentially the same both after 2 months under water and after accelerated shell life at 130° F. The alkaline nature of moist cement did not affect the adhesion. Silicon-treated parchment paper was placed on the adhesive coatings during storage, and could be peeled off easily for use.

A coating 2 mils thick on vinyl-asbestos tile produced a shear adhesion, or "holding power," at 130° F. (P.S.T.C. #7) of about 30 minutes.

EXAMPLE 2

A pressure-sensitive hot-melt adhesive was prepared substantially as described in Example 1 from a preblend of 24.90 parts of Kraton 101 and 24.90 parts of Shellflex 371–N, to which preblend were added 0.40 part of Ionox 330 antioxidant and 49.80 parts of Piccolyte Alpha 115. Coatings of the adhesive on various materials produced similar satisfactory results as described in Example 1.

EXAMPLE 3

A pressure-sensitive hot-melt adhesive was prepared substantially as described in Example 1 from a preblend of 23.00 parts of Kraton 101 and 11.50 parts of Shellflex 371–N, to which preblend were added 0.5 part of Ionox 330 antioxidant and then 23.00 parts of Oletac 100 atactic polypropylene and 42.00 parts of Piccolyte Alpha 115. Coatings of the adhesive on various materials produced similar satisfactory results as described in Example 1.

EXAMPLE 4

A pressure-sensitive hot-melt adhesive was prepared substantially as described in Example 3 from a preblend of 26.10 parts of Kraton 101 and 13.00 parts of Shellflex 371–N, to which preblend were added 0.60 part of Ionox 330 antioxidant, 13.00 parts of Oletac 100 and 47.30 parts of Piccolyte Alpha 115. Coatings of the adhesive on various materials produced similar satisfactory results as described in Example 1.

EXAMPLE 5

A pressure-sensitive hot-melt adhesive was prepared substantially as described in Example 1 from a preblend of 30.00 parts of Kraton 101 and 15.00 parts of Shellflex 371–N, to which preblend were added 0.75 part Ionox 330 and 54.25 part of Piccolyte Alpha 115. Coatings of the adhesive on various materials produced similar satisfactory results as described in Example 1.

EXAMPLE 6

A pressure-sensitive hot-melt adhesive was prepared substantially as described in Example 1 from a preblend of 30.00 parts of Kraton 101 and 15.00 parts of "Sunthene" No. 380, a rubber-extending petroleum oil, specific gravity 0.9279, viscosity 780 SSU at 100° F., to which preblend were added 0.75 part of Ionox 330 and 54.25 parts of Piccolyte Alpha 115. Coatings of the adhesive on various materials produced similar satisfactory results as described in Example 1.

It will of course be understood that numerous modifications can be made in the ingredients, proportions and conditions described in the foregoing examples without departing from the scope of this invention as disclosed hereinbefore and as defined in the claims appended hereafter.

I claim:

1. A method of making a pressure-sensitive adhesive composition having instant room temperature tack, good cold flow resistance and good shear strength which comprises: tumbling together as a first component from about 15% to about 50% of a polystyrene-polybutadiene-polystyrene or a polystyrene-polyisoprene-polystyrene copolymer whose polystyrene blocks have molecular weights of from about 5000 to about 125,000 and are from about 20% to about 80% by weight of said copolymer, and whose polybutadiene or polyisoprene blocks have molecular weights of from about 15,000 to about 250,000, and as a second component from about 10% to about 40% of a rubber-extending petroleum oil that is paraffinic, naphthenic or aromatic and has a specific gravity of about 0.80 to about 1.00, a viscosity at 100° F. of about 100 to about 1000 SSU, and is 90% distillates at about 700° F. to about 1000° F., to form a uniform preblend of them; melting said preblend to form a hot-melt thereof; and blending into said hot-melt as a third component from about 20% to about 70% of an ethylene glycol, polyethylene glycol, glycerol or pentaerythritol rosin ester, hydrogenated rosin ester or methylated rosin ester, a coumarone-indene resin having a molecular weight of from about 150 to about 800, a poly($\alpha$-pinene) or poly($\beta$-pinene) resin, a diene-olefin aliphatic hydrocarbon resin having a molecular weight of about 500 to about 1800, or a homopolymeric polystyrene resin having a molecular weight of from about 200 to about 6000, to form a homogeneous adhesive composition thereof; said percent values being by weight of said components in said composition.

2. A method of making a pressure-sensitive adhesive composition according to claim 1 wherein said preblend is formed at a temperature of from about 60° F. to about 150° F., and said homogeneous adhesive is blended at a temperature of from about 250° F. to about 350° F.

3. A method of making a pressure-sensitive adhesive composition according to claim 1 wherein said first component is used in an amount of from about 20% to about 35%, said second component is used in an amount of from 20% to about 30%, and said third component is used in an amount of about 40% to about 60%.

4. A method of making a pressure-sensitive adhesive composition according to claim 1 wherein the amount of said second component preblend with said first component is from about one-half to about equal the amount of said first component.

5. A method of making a pressure-sensitive adhesive composition having instant room temperature tack, good cold flow resistance and good shear strength which comprises: tumbling together as a first component from about 15% to about 50% of a polystyrene-polybutadiene-polystyrene or a polystyrene-polyisoprene-polystyrene copolymer whose polystyrene blocks have molecular weights of from about 5000 to about 125,000 and are from about 20% to about 80% by weight of said copolymer, and whose polybutadiene or polyisoprene blocks have molecular weights of from about 15,000 to about 250,000, and as a second component from about 7% to about 30% of a rubber-extending petroleum oil that is paraffinic, naphthenic or aromatic and has a specific gravity of about 0.80 to about 1.00, a viscosity at 100° F. of about 100 to about 1000 SSU, and is 90% distillates at about 700° F. to about 1000° F., to form a uniform preblend of them; melting said preblend to form a hot-melt thereof; and blending into said hot-melt as a third component from about 20% to about 60% of an ethylene glycol, polyethylene glycol, glycerol or pentaerythritol rosin ester, hydrogenated rosin ester or methylated rosin ester, a coumarone-indene resin having a molecular weight of from about 150 to about 800, a poly($\alpha$-pinene) or poly($\beta$-pinene) resin, a diene-olefin aliphatic hydrocarbon resin having a molecular weight of about 500 to about 1800, or a homopolymeric polystyrene resin having a molecular weight of about 200 to about 6000, and as a fourth component from about 5% to about 30% of a resinous atactic polypropylene having a molecular weight of about 15,000 to about 60,000, to form a homogeneous adhesive composition thereof, said percent values being by weight of said components in said composition.

6. A method of making a pressure-sensitive adhesive composition according to claim 5 wherein said preblend is formed at a temperature of from about 60° F. to about 150° F., and said homogeneous adhesive is blended at a temperature of from about 250° F. to about 350° F.

7. A method of making a pressure-sensitive adhesive composition according to claim 5 wherein said first component is used in an amount of about 20% to about 35%, said second component is used in an amount of about 10% to about 25%, said third component is used in an amount of about 35% to about 50%, and said fourth component is used in an amount of about 10% to about 25%.

8. A method of making a pressure-sensitive adhesive composition according to claim 5 wherein the amount of said second component preblended with said first component is from about one-half to about equal the amount of said first component.

9. A method of making a pressure-sensitive adhesive composition according to claim 5 wherein said fourth component is first blended into said hot-melt and then said third component is blended into said hot-melt.

References Cited

UNITED STATES PATENTS

| 3,239,478 | 3/1966 | Harlan | 260—27 |
| 3,360,488 | 12/1967 | Hall et al. | 260—27 |

OTHER REFERENCES

Skeist I "Handbook of Adhesives," 1962, (pp. 190, 192 and 193). Copy in group 140.

Kopyscinski et al., "Adhesive Age," 1960, (copy in group 140) p. 33 relied on.

HOSEA E. TAYLOR, Primary Examiner

W. E. PARKER, Assistant Examiner

U.S. Cl. X.R.

117—145, 161; 260—93.3, 829, 876, 879

UNITED STATES PATENT OFFICE
CERTIFICATE OF CORRECTION

Patent No. 3,635,861            Dated 1/18/72

Inventor(s) Thomas E. Russell

It is certified that error appears in the above-identified patent and that said Letters Patent are hereby corrected as shown below:

Col. 2, lines 64-65, delete ", all sold by, "Foral" 85 and 105, "Hercolyn D" and "Pentalyn" H and K";

Col. 3, line 14, change "Poly" to -- poly --; Col. 3, line 33, change "Zinc Dibutyl Dithiocarbamate" to -- zinc dibutyl dithiocarbamate --; Col. 4, line 7, change "crums" to -- crumbs --.

Signed and sealed this 13th day of June 1972.

(SEAL)
Attest:

EDWARD M. FLETCHER, JR.
Attesting Officer

ROBERT GOTTSCHALK
Commissioner of Patents